Aug. 14, 1923.
C. M. CARNELLI
GAS SOLDERING IRON
Original Filed March 23, 1921
1,464,497
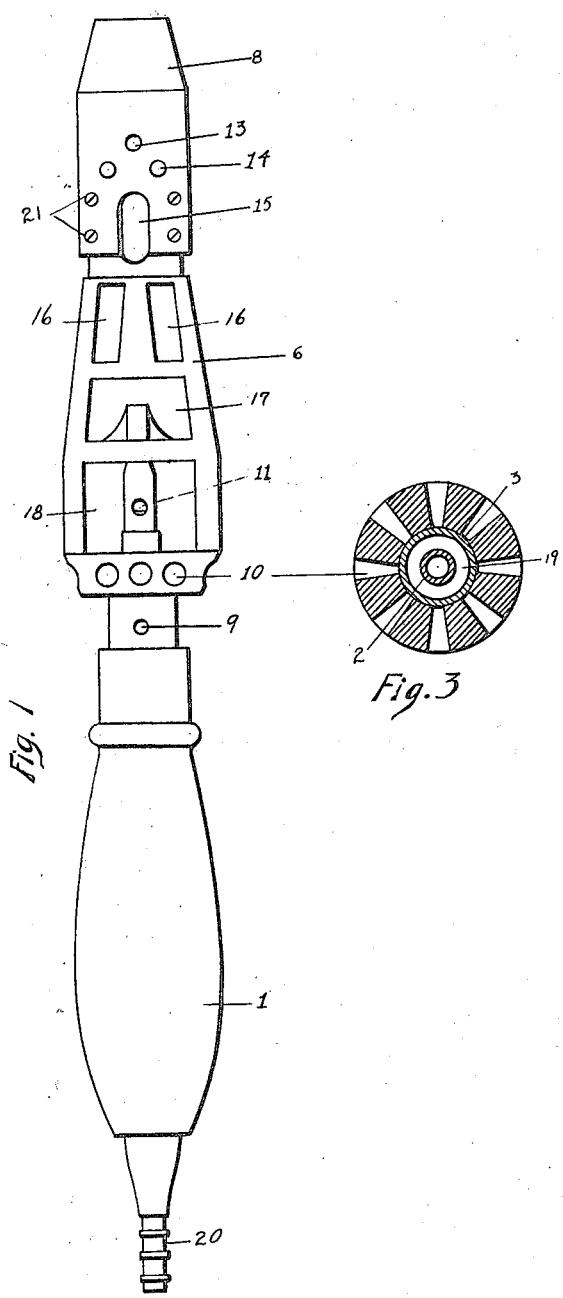
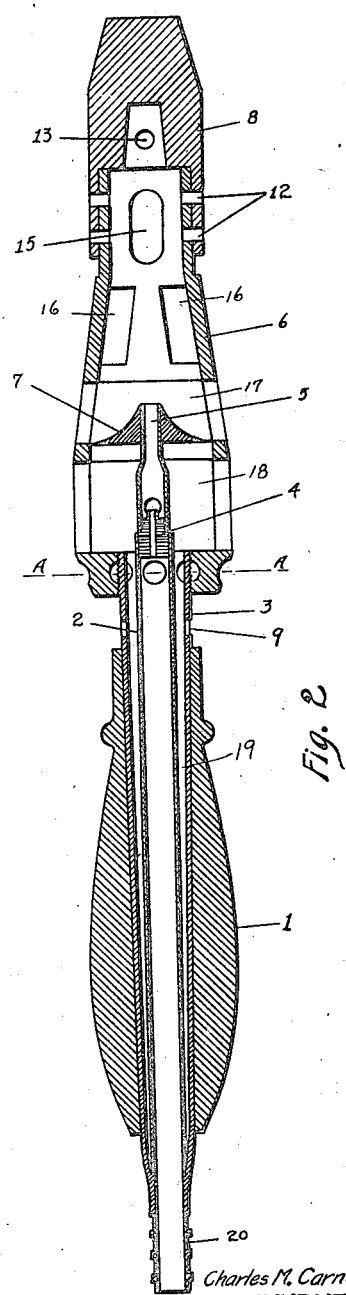
Charles M. Carnelli
INVENTOR
BY Kenyon & Kenyon
ATTORNEYS Patented Aug. 14, 1923.

1,464,497

UNITED STATES PATENT OFFICE.

CHARLES M. CARNELLI, OF NEW YORK, N. Y.

GAS SOLDERING IRON.

Application filed March 23, 1921, Serial No. 454,794. Renewed January 10, 1923.

*To all whom it may concern:*

Be it known that I, CHARLES M. CARNELLI, a citizen of the United States, and a resident of New York, in the county and State of New York, have invented a new and improved Gas Soldering Iron, of which the following is a specification.

My invention is an improved gas soldering iron.

It has for its object to provide a soldering iron of such construction that its efficiency can be relied on to successfully meet the various conditions that arise in actual practice.

This main object I accomplish by the production of a tool which is simple in construction, economic to manufacture because of the saving of material called for in its structure, and which, on account of its complete and perfect consumption of fuel, does away with practically all waste of gas and gives a maximum amount of heat to the solderer.

The efficiency of the tool is also considerably augmented by the ease and quickness with which the solderer is brought to working heat, thus saving the time of the workman which is now lost by the slowness in this respect of other tools of this general type.

The time spent in retinning and reforging soldering tools now more or less in vogue, is also an important matter in practical work which my improved devices reduces to a minimum. For instance, my device may not need retinning more than once in two or three days, while the ordinary tool requires this process a number of times daily.

Another important item is the saving in gas effected by my device, tests having shown that in its practical operation there is a saving of about seventy-five per cent of gas over that of tools of this general type.

Referring to the embodiment of my invention illustrated in the drawings, wherein similar reference numerals refer to like parts, Figure 1 is an elevation of my complete soldering iron; Figure 2 is a vertical section through the centre of Fig. 1, and Figure 3 is a horizontal section on the line A—A of Fig. 2.

In the drawings the soldering iron is shown in its assembled form, but it is to be understood that it consists of handle, housing or combustion chamber, mixing chamber, a pierced plug or jet member and solderer or soldering tip, which parts can of course be separated or assembled at will.

As shown in the drawings, the handle of my device is hollow throughout the greater part of its length, and is made up of the outer wooden hold 1, and two steel tubes 2 and 3, with an air space 19 between them. Mounted in the inner tube, which tapers slightly, is a jet member 4, which projects into the mixing chamber 5, located in the housing or combustion chamber 6. The housing 6 is mounted or coupled in any desired way on the outer tube 3. It will be noticed that by this construction a wall of air is interposed between the wall supporting the jet member and that on which the housing is mounted, the advantage of which will presently appear. At the upper end of mixing chamber 6 is a shield 7 whose object is hereinafter explained.

8 is the solderer or soldering tip which, as shown, is removable and adjustable. It is preferably made of copper or any suitable alloy.

In the outer steel tube 3 forming part of the handle, are apertures 9 for the admission of air which, while helping to maintain the handle in a cool condition, also prevents heat conducted from the solderer and housing, from reaching the inner wall to any appreciable extent, thus keeping the jet member cool and free from any tendency to ignite. Holes or openings 10 are located in the lower part of the housing to further assist in this object.

In the mixing chamber are openings 11 of such size as to secure an efficient mixture of gas and air for supplying uniform heat to the solderer, regardless of the position in which the tool is held while in use.

The soldering tip may be attached to the housing in any suitable way. The method illustrated in the drawings is by means of screws 21. I consider it an advantage to make the soldering tip adjustable so that the length of flame travel can be regulated, and increased or diminished in accordance with the needs of any particular case. For this purpose the soldering tip is provided with upper and lower sets of screw holes 12, the set farthest from the tip being used when it is desired to lengthen the flame travel, both being used at other times. 13 and 14 are holes inclining upward from the tip of the solderer, which serve the double purpose of carrying off the products of combustion, and for providing the necessary atmospheric pressure when the tool is used in a downward vertical position.

15, 16, 17 and 18 indicate elongated apertures in the housing. I preferably construct the housing of light iron, and make the apertures as large as possible consistent with proper strength of the tool. In this way I secure a most efficient combustion chamber with the least amount of material, and minimize the heat conducted from the copper solderer. While I prefer to make the housing of quadrangular shape it may of course be made circular in form without the sacrifice of efficiency.

My improved device operates as follows. After the source of supply is coupled in any usual way at 20 to inner tube 2 of the handle, the gas under pressure flows through said tube 2 to jet member 4 and mixing chamber 5, drawing air with it through apertures 11. It is ignited as it leaves 5 and, assisted by the air coming through the apertures in the combustion chamber, an intense blue flame results, indicating complete combustion, and the solderer is speedily heated to the necessary intensity and ready for work. It can be used in any position with equal ease and efficiency.

This is so even when it is used in a vertical downward position which is where the ordinary gas solderer is a failure.

When in the course of the work and after the solderer has become red hot, it is found necessary to use the tool in a downward vertical, or substantially vertical, position, the blue or heating flame tends to "back up" on itself. This in a tool of ordinary construction, would cause the heat waves to flow around the jet member 4 and cause the same to ignite, with the consequent production of a yellow or lighting flame from the tip 5, which would mean that the heat in the solderer had been reduced and more or less cooled, and its efficiency decreased. My improved construction, however, makes this impossible. In a certain sense the jet member is isolated. Being mounted on the inner steel tube of the handle, it is protected by the air barrier 19, and the air holes 10 in the lower part, and the apertures 16, 17 and 18 in the body of the housing, as well as the openings 9 in the outer tube of the handle, assist in dissipating the heat and preventing its conduction to the valve.

Furthermore the shield 7 receives and deflects such heat waves as rise while the device is held in a vertical downward position, so that the amount of heat, if any, reaching the jet member is negligible.

The holes 13 and 14 in the solderer are also of material assistance in overcoming this trouble of flooding, as it is called. These holes are inclined upward from the tip, and permit the outside atmosphere to exert the necessary pressure in the needed direction, and maintain the proper mixture.

The solderer may be made of any size or shape, and it is evident that various changes may be made in the construction illustrated without departing from the principle of my invention.

What I claim as new and desire to secure by Letters Patent, is:

1. A gas soldering iron comprising a hollow soldering tip having a plurality of openings, a casing with apertures therein, a mixing chamber and jet member within said casing, and a handle consisting of two tubular members with an air space between them, said casing being mounted on one of said members, and means for connecting a source of fuel supply to the other of said members, said jet mounted at the inner end of the last mentioned member, and the orifice through it being much smaller than the opening in the fuel supply member, substantially as described.

2. A gas soldering iron comprising a soldering tip, a casing with apertures therein, a mixing chamber and jet member within said casing, and a handle consisting of two tubular members with an air space between them, the mixing chamber and jet member being mounted on the inner, and the casing being mounted on the outer, of said tubular members, and means for connecting a source of fuel supply to the inner one of said members, said jet member being separable from, and extending from its mounting at the inner end of, the fuel supply member into the mixing chamber, and the orifice through said jet member being much smaller than the passage through the fuel supply member, substantially as described.

3. A gas soldering tool comprising a soldering tip, a casing with apertures therein enclosing a jet member and mixing chamber, the soldering tip being removably mounted on said casing and adjustable thereon so as to increase or diminish the length of flame travel from the mixing chamber, and a handle consisting of two tubular members spaced from each other, the casing being mounted on the outer of said tubular members, and means for connecting the inner of said members with a source of fuel supply, the jet member extending into the mixing chamber from its mounting in the inner end of the fuel supply member, its orifice being much smaller than the passage through the fuel supply member, substantially as described.

4. In a tool of the class described comprising a handle, a casing, mixing chamber, jet member and a soldering tip, of a shield with a concave upper surface placed near the tip of the mixing chamber, as and for the purpose described.

5. In a tool of the class described comprising a handle, a casing, mixing chamber, jet member and a soldering tip, of a shield with a concave upper surface placed near the tip of the mixing chamber, the handle consisting of two tubular members with an air space between them, the mixing chamber and jet member being mounted on the inner of said members, and the outer tubular member supporting the casing, substantially as described.

6. In a tool of the class described comprising a handle, a casing, mixing chamber, jet member and a soldering tip, of a shield with a concave upper surface placed near or at the tip of the mixing chamber, the handle consisting of two tubular members with an air space between them, the mixing chamber and jet member being mounted on the inner of said members, and the outer tubular member supporting the casing, said casing having elongated openings in its sides, and a series of circular openings in its base, substantially as and for the purpose described.

7. In a tool of the class described, a casing with elongated openings in its sides and a series of circular openings in its base, a soldering tip, with inclined openings therein, and removable from and adjustable on one end of said casing, a handle consisting of two hollow members with an air space between them, the outer one of which supports the other end of said casing, air openings in said outer member, and a mixing chamber with air inlets therein mounted in the inner of said tubular members, as and for the purpose described.

8. In a tool of the class described, a casing with elongated openings in its sides and a series of circular openings in its base, a soldering tip, having inclined openings, removable from and adjustable on one end of said casing, a handle consisting of two hollow members with an air space between them, the outer one of which supports the other end of said casing, air openings in said outer member, a mixing chamber with air inlets therein mounted in the inner of said tubular members, and a shield with a concave surface mounted near or at the tip of said mixing chamber, substantially as and for the purpose set forth.

9. In a tool of the class described, a handle consisting of a wooden hand-piece, tubular members spaced from each other, a member with a contracted opening therein and a mixing chamber mounted on one of said tubular members, the casing being mounted on the other of said tubular members, a solderer adjustably and removably mounted on said casing, a shield located at or near the tip of the mixing chamber and adjacent openings in said casing, and means for connecting a source of fuel supply with the tubular member on which are mounted the mixing chamber and the member with the contracted opening, substantially as and for the purpose set forth.

10. In a tool of the class described, a casing contracted at one end with means at said end for adjustably attaching a soldering tip thereto at points nearer to or farther from the body of said casing, the other end being pieced by a series of air openings and adapted to have connected thereto a handle and source of fuel supply, said air openings to surround said handle and source of fuel supply at approximately their point of connection to the casing, said casing, intermediate its ends, having a plurality of openings therein, substantially as described.

In testimony whereof, I have signed my name to this specification.

CHARLES M. CARNELLI.